United States Patent
Edwards et al.

[11] Patent Number: 5,867,246
[45] Date of Patent: Feb. 2, 1999

[54] ENHANCED OPHTHALMIC LENS

[75] Inventors: Simon John Edwards, St. Peters, Australia; Eric Barkan, Novato; David Howard Sklar, San Francisco, both of Calif.; Dimitrios Jack Kris, Fulham Gardens; Mark Thyssen, Clarendon, both of Australia

[73] Assignee: Sola International Holdings, Ltd., Australia

[21] Appl. No.: 776,020

[22] PCT Filed: Oct. 20, 1995

[86] PCT No.: PCT/AU95/00695

§ 371 Date: Jan. 17, 1997

§ 102(e) Date: Jan. 17, 1997

[87] PCT Pub. No.: WO96/12984

PCT Pub. Date: May 2, 1996

[30] Foreign Application Priority Data

Oct. 21, 1994 [AU] Australia ............................... PM8940
Jun. 1, 1995 [AU] Australia ............................... PN3336

[51] Int. Cl.⁶ ................................................. G02C 7/06
[52] U.S. Cl. ................................................. 351/169
[58] Field of Search ................................ 351/168, 169, 351/170, 171, 172

[56] References Cited

U.S. PATENT DOCUMENTS

| | | | |
|---|---|---|---|
| 2,869,422 | 1/1959 | Cretin-Maitenaz | 351/169 |
| 2,878,721 | 3/1959 | Kanolt | 351/169 |
| 3,010,366 | 11/1961 | Crawford | 351/169 |
| 3,687,528 | 8/1972 | Maitenaz | 351/169 |
| 3,785,724 | 1/1974 | Cretin-Maitenaz | 351/169 |
| 4,362,368 | 12/1982 | van Ligten | 351/169 |
| 4,537,479 | 8/1985 | Shinohara et al. | 351/169 |
| 4,592,630 | 6/1986 | Okazaki | 351/169 |
| 4,613,217 | 9/1986 | Fuerter et al. | |
| 4,729,651 | 3/1988 | Kitani | |

(List continued on next page.)

FOREIGN PATENT DOCUMENTS 0027339  4/1981  European Pat. Off. .

OTHER PUBLICATIONS

Guilino, "Design philosophy for progressive addition lenses", 32 *Applied Optics*, No. 1, pp. 111–117 (1993).

Technical and Marketing material on Rodenstock Cosmolit P Target Market: Presbyopes from 1993 and 1994, Aug. 1993, Astigmatism and Power Plots.

"*Essilor Delta/Varilux Readables Reading Lens Evaluation*", REF PE: 1143, Hiskey et al., pp. 9, 10, 11, 13, 14, 15, Astigmatism and Power Plots.

Advertisment for *American Optical TruVision Technica®*, 1994, Astigmatism and Power Plots.

"The Revolution for Indoor Vision", Zeiss, *Optician* 22, Jul. 1994, p. 3.

"Gradal® RD. Die Raum–Revolution", *Optica*, Apr. 1994, pp. 7, 8, 9, Astigmatism and Power Plots.

"*Translation of 'Seiko Plax Senior 50' Progressive Promotional Material By Mr. Sakai*, 8 Sep. 1989", Astigmatism and Power Plots.

*Primary Examiner*—Scott J. Sugarman
*Attorney, Agent, or Firm*—Burns, Doane, Swecker & Mathis LLP

[57] ABSTRACT

A progressive ophthalmic lens including a lens surface having: a lower viewing zone providing good optical quality at a predetermined high surface power over a large area of vision; said predetermined power being determined by the viewer's near prescription ($R_x$) the horizontal fitting position normally being determined by the near pupillary distance of the wearer, and the vertical fitting position normally being determined by the vertical frame midpoint, an upper viewing zone of lower surface power providing an enhanced range of vision for intermediate or greater viewing distances; and a corridor of relatively low astigmatism extending therebetween; wherein the contours of mean surface power and/or surface astigmatism within the lower viewing zone, upper viewing zone and corridor are generally symmetric about a vertical lens meridian as fitted to the wearer.

12 Claims, 2 Drawing Sheets

U.S. PATENT DOCUMENTS

| | | |
|---|---|---|
| 4,762,408 | 8/1988 | Shinohara . |
| 4,778,266 | 10/1988 | Maitenaz . |
| 4,786,160 | 11/1988 | Furter ................................. 351/169 |
| 4,796,988 | 1/1989 | Dufour et al. ...................... 351/169 |
| 4,806,010 | 2/1989 | Ewer et al. ......................... 351/169 |
| 4,861,153 | 8/1989 | Winthrop . |
| 4,906,090 | 3/1990 | Barth . |
| 5,110,199 | 5/1992 | Ishida . |
| 5,123,725 | 6/1992 | Winthrop . |
| 5,285,222 | 2/1994 | Waido . |
| 5,327,181 | 7/1994 | Waido . |
| 5,708,492 | 1/1998 | Kitani ................................. 351/169 |
| 5,708,493 | 1/1998 | Ahsbahs et al. .................... 351/169 |
| 5,710,615 | 1/1998 | Kitani ................................. 351/169 |
| 5,715,032 | 2/1998 | Isenberg ............................. 351/169 |
| 5,805,265 | 9/1998 | Umeda ............................... 351/169 |

FIG. 1

Radius=30.00 mm 0.50 D 1.00 D 1.00 D

Scale (mm)
0    10

FIG. 2

Radius=30.00 mm 0.50 D 1.00 D

Scale (mm)
0    10

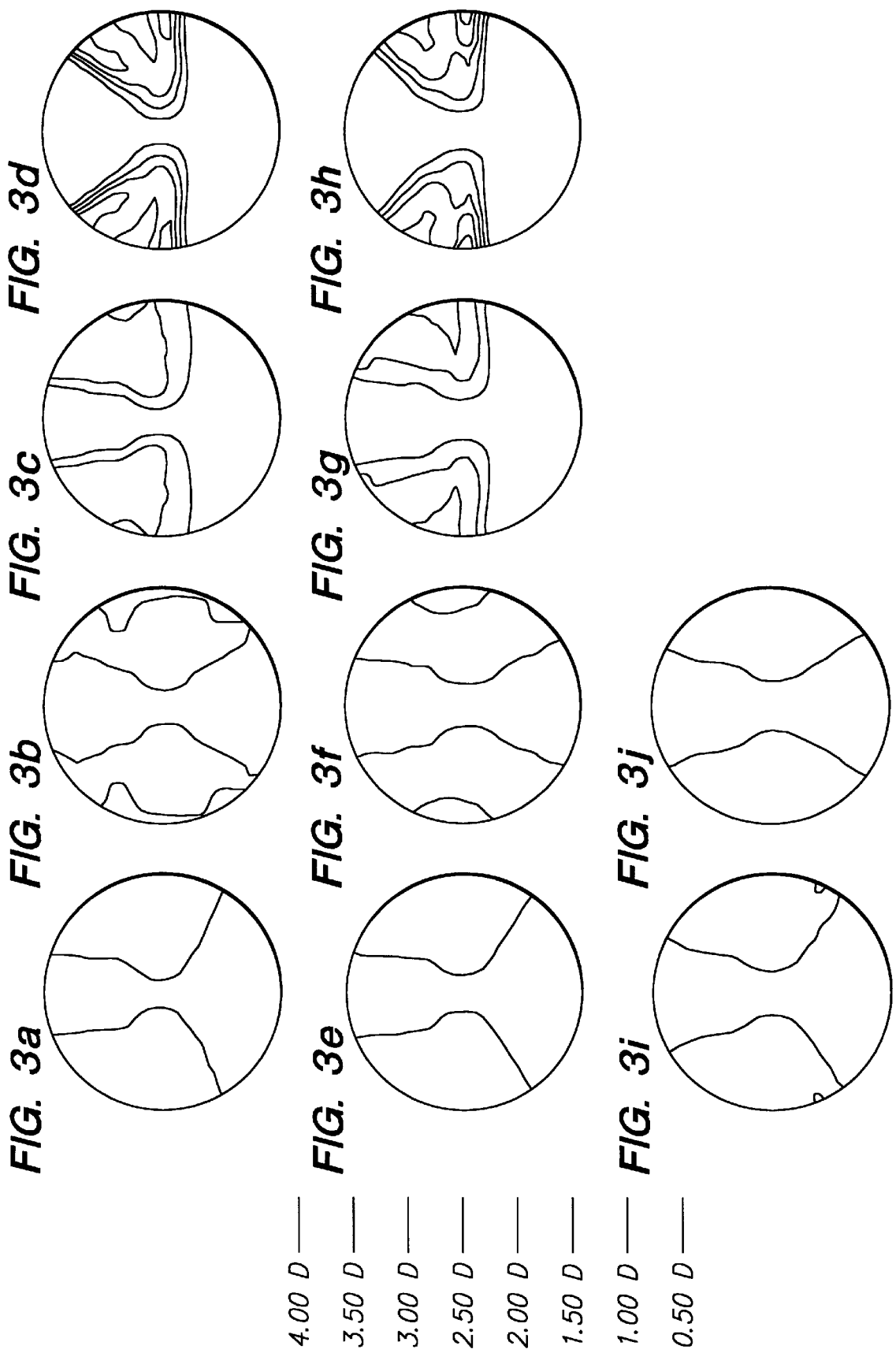

ENHANCED OPHTHALMIC LENS

The present invention relates to a progressive ophthalmic lens and in particular an ophthalmic progressive lens exhibiting improved optical performance in the near viewing region. It is a feature of the present invention to provide spectacles designed specifically for near and intermediate vision and providing improved flexibility providing the wearer with an improved range of vision and improved fitting.

Numerous progressive lenses are known in the prior art. A progressive lens in general exhibits a distance, near and intermediate viewing zone in which the intermediate zone joins the near and distance zones in a cosmetically acceptable way, in the sense that no discontinuities in the lens should be visible to people observing the lens of the wearer. The intermediate zone should be optically acceptable in the sense that there should be a line or corridor called the eye path along which the line of vision moves while going between the distance and near zones, and along which the optical power of the lens increases more or less uniformly. It is normal to select an eye path with a slant to accommodate the natural convergence of the eyes along the path.

However, the design of progressive lenses in the prior art has concentrated on maximising the optical quality in the distance viewing zone. To achieve this the distance viewing zone has been specified to have a precise optical power and a large size. This has meant a limited area of vision which can be covered within the near vision zone through vertical and horizontal movement of the eyes alone.

In practice the optical power of the near viewing zone has been determined indirectly from the power of the distance zone through the addition of an add power to the optical power of the distance viewing zone. A disadvantage of prior art progressive lenses is that they are difficult to fit. Such lenses must be fitted to a carefully measured pupillary height relative to the lower frame edge, and to a carefully measured pupillary distance relative to the nasal frame edge. Errors of as little as 1 or 2 mm in either measurement can cause significant reductions in lens utility.

In other aspects of prior art, single vision lenses have been used to assist presbyopic patients with near viewing tasks. Such lenses provide a very wide near viewing area which is relatively free of optical aberrations. However, a disadvantage of such lenses is that they restrict the range of viewing distances available to the wearer since objects beyond a certain distance (typically beyond about 0.3 to 1 meter) will be out of focus due to the extra convergent power required in the lens to replace the accommodative deficit of the patient. However, single vision reading lenses have the advantage of easy fitting. Horizontal fitting is normally accomplished by using the near pupillary distance of the wearer. Vertical fitting is accomplished by placing the lens optical centre at the vertical frame midpoint (the so-called "frame datum"). Thus, no special fitting procedures, such as are used with progressive lenses, are required with single vision reading lenses.

Moreover, in the prior art, in order to provide a range of distance and near zone optical powers which permit optimum fitting of the lens to most presbyopic patients, a large family of progressive lens blanks with different distance and near zone powers have been necessary. It would be a significant advance in the art if an ophthalmic lens could be designed which requires a smaller family of individual lens types to satisfy the near and intermediate viewing needs of a wide range of patients. This would be more nearly similar to the number of blanks in a single vision reading lens series.

In the prior art, the large power change between the distance and near viewing zones results in large power and aberration gradients which greatly restrict the permissible fitting positions for the lens.

It would be a significant advance in the art if an ophthalmic lens could be designed with reduced sensitivity to horizontal fitting errors (such as errors in pupillary distance measurement of the wearer) and vertical fitting height errors ascribed to frame and face conformation measurement errors. This would make such lenses more similar in ease of fitting to single vision reading lenses.

It is accordingly an object of the present invention to overcome or at least alleviate one or more of the difficulties and deficiencies related to the prior art.

Accordingly, in a first aspect of the present invention there is provided a progressive ophthalmic lens including a lens surface having a lower viewing zone providing good optical quality at a predetermined high surface power over a large area of vision; said predetermined power being determined by the viewer's near prescription ($R_x$) the horizontal fitting position normally being determined by the near pupillary distance of the wearer, and the vertical fitting position normally being determined by the vertical frame midpoint;

an upper viewing zone of lower surface power providing an enhanced range of vision for intermediate or greater viewing distances; and a corridor of relatively low astigmatism extending therebetween; wherein the contours of mean surface power and/or surface astigmatism within the lower viewing zone, upper viewing zone and corridor are generally symmetric about a vertical lens meridian as fitted to the wearer.

In contrast to the prior art, it is a feature of the present invention to place emphasis on both near and intermediate vision, with the aim of providing spectacles designed specifically for near and intermediate vision. This results in a lens which is superior to conventional progressive lenses for near and intermediate viewing and also superior to single vision reading lenses in providing an increased range of distances at which vision is sharp.

In order to do this the near viewing zone has been specified to have a precise optical power and a large size, and the upper zone power is determined indirectly from the power of the near through the subtraction of a power change from the optical power of the near viewing zone. The magnitude of this power change is selected so that the resulting upper zone power will be suitable for intermediate distance viewing. There may be no portion of the lens which is suitable for distance viewing.

In the progressive lens according to the present invention the optical quality may be maximised in the lower viewing zone and the optical power of the upper viewing zone is determined indirectly by the application of a power reduction from the optical power of the lower viewing zone. This may mean a limited area of vision which can be covered within the upper viewing zone through vertical and horizontal movement of the eyes alone.

A consequence of the lens providing preferably only for near and intermediate or greater distance vision is that the total power change between the upper and lower viewing zones will be substantially less than in a conventional progressive lens. The resulting reduced gradient leads to a wider corridor which is more tolerant of horizontal fitting errors and also to less sensitivity to vertical fitting errors.

As used herein the term "lens" refers to all forms of refractive optical bodies employed in the ophthalmic arts, including, but not limited to, semi-finished lens blanks requiring further finishing to a particular patient's prescription. Also included are formers used in the manufacture of progressive glass lenses, and moulds for the casting of progressive lenses in polymeric material such as the material sold under the trade designation CR39.

As used herein the term "astigmatism" refers to surface astigmatism, which is a measure of the degree to which the curvature of the lens varies among intersecting planes which are normal to the surface of the lens at a point on the surface.

As used herein, the term "lens meridian" refers to an imaginary line of symmetry drawn through the power progression centre of a lens as fitted to the wearer.

As used herein, the term "zone width" refers to the horizontal distance between similar contours of surface astigmatism, surface power, optical power, or index of blur or other appropriate optical properties, defining a threshold of optical quality, for example the 0.50D surface astigmatism contour.

Preferably the lower viewing zone of the progressive ophthalmic lens according to the present invention defines a relatively large near viewing zone.

The predetermined optical power Rx of the lower viewing zone may for example range from approximately −5.00D to +5.00D.

In an especially preferred arrangement, the physical size of the lower viewing zone may be sufficient to allow fixation over an area of for example approximately 24 cm horizontal×12 cm vertical at a distance of approximately 0.3 m or 0.4 m with high acuity through movement of the eyes alone.

This may be achieved by having for example a lower viewing zone width of at least approximately 16 mm, measured on the lens surface, at a vertical position between approximately 5 to 15 mm below the power progression centre.

The upper viewing zone may for example have a zone width of approximately 10 mm at a vertical position between about 5 to 15 mm above the power progression centre.

Preferably the upper viewing zone defines a relatively large intermediate power viewing zone and the lower viewing zone defines a relatively large high power viewing zone.

Therefore, the progressive ophthalmic lens according to the present invention may provide similar, preferably substantially symmetrical, distributions of optical properties in each of the lower and upper viewing zones.

The progressive ophthalmic lens may be designed to have a uniform growth of power from the centre of one viewing zone to the other along the corridor of relatively low astigmatism.

The corridor or eye path between the lower viewing zone and the upper viewing zone in this embodiment extends generally along the vertical lens meridian. This may be contrasted with a traditional progressive lens wherein the eye path is slanted. An advantage of this, it will be understood, is that as the corridor or eye path is generally vertical as fitted, there is no necessity to produce separate left and right lenses. An additional visual benefit is good performance throughout the near zone due to the vertical orientation of the zone centreline as fitted.

The corridor or eye path may be relatively short providing a short transition from one viewing zone to the other. Progression length of from approximately 5 mm to 20 mm, preferably approximately 10 mm, may be provided. Progression power magnitude along the corridor may range from approximately 0.50D to 2.00D.

In a further preferred aspect the mean surface power and/or surface astigmatism contours may separate generally uniformly above and below the region of the lens corridor. Such generally uniform separation of contours creates a steady expansion of the width of the visual fields, but preferably with a minimum tendency to close at upper or lower extremes of the lens. This may be contrasted with the two viewing zones which would result if the lens was constructed to grow symmetrically from design centres corresponding substantially with the centres of these viewing zones.

In a still further preferred aspect the mean surface power and/or surface astigmatism contours may form generally radial boundaries to the lower and upper viewing zones.

Progressive ophthalmic lenses of the type described above are illustrated in the contour plots in FIG. 1 below.

In a preferred embodiment the lens surface may be described by equations of the types disclosed in U.S. Pat. Nos. 4,676,610 and 4,838,675 to applicants, the entire disclosures of which are incorporated herein by reference.

As disclosed in these patents, Cartesian coordinates x, y are defined in terms of curvilinear coordinates u, v by polynomial transformations. These transformations are chosen such that the curvilinear coordinate v is constant along desired polynomial zone boundary curves. The lens surface height is then defined as a function of the curvilinear coordinates ("Final Surface Function") which is in turn a sum of a "Base Surface Function" and a polynomial "Optimisation Function".

The resulting surface may have the form of any rotationally summetric surface in the upper or intermediate viewing zone, including spherical or polynomial aspheric forms. In the lower, or near viewing zone the surface is the sum of a polynomial in x and y added to the surface function occurring in the upper viewing zone.

The present invention will now be more fully described with reference to the accompanying drawings and examples. It should be understood, however, that the description following is illustrative only and should not be taken in any way as a restriction on the generality of the foregoing description.

In the Figures:

FIG. 1 is a contour plot of surface astigmatism of a progressive lens formed utilising the surface functions presented in Example 1 below where the intermediate distance viewing zone is a spherical surface.

FIG. 2 is a contour plot of surface astigmatism of a progressive lens formed utilising the surface functions presented in Example 2 below where the intermediate distance viewing zone is an aspherical surface of revolution.

FIG. 3a to j is a series of contour plots of surface astigmatism of a series of 10 progressive ophthalmic lenses according to the present invention.

MANUFACTURE OF LENSES AND ASSOCIATED TOOLING

Methods for producing progressive lenses from a final surface function will be known to those skilled in the art. For example, the manufacture of such a progressive lens may be carried out by using the final surface function referred to above to provide height values for a multiplicity of points, e.g. at 1 millimeter centres, and then, by means of a numerically controlled milling machine, producing a porous ceramic former with a surface configuration corresponding to the aforementioned height values.

The porous ceramic former, thus prepared, can then be used in a conventional manner to form a progressive surface of a glass lens or lens blank by sag forming techniques. The porous former can also be used to form a mould part, which can then be used to form the progressive surface in a cast lens in a conventional lens casting process. Techniques of using such formers are described in, for example, U.S. Pat. No. 4,062,629 to Winthrop (see columns 14 and 19).

It will be apparent that, because of the inherent limitations of the milling procedure and the need to then carry out one or more steps before achieving the desired progressive lens surface on a lens or lens blank, the progressive lens surface obtained cannot match in a mathematically exact manner the expressions used to generate the instructions for the milling machine. Another inaccuracy inherently induced in the process is caused by the fact that the milling machines necessarily employ a finite size of grid. The correspondence between the final surface function and the manufactured surfaces will vary slightly as one moves from former to lens or from former to mould to lens. However, it has been found in practice that variations so introduced are limited and do not result in a lens whose performance characteristics are unpredictable. The lens form is, of course, the tangible article whose form will most closely correspond to the final surface function.

EXAMPLE 1

In this example a Cartesian coordinate system is introduced such that the origin lies at the geometric center of the lens blank and x increases to the right and y increases upward. It is convenient to employ a coordinate transformation from Cartesian coordinates to Curvilinear coordinates. Curvilinear coordinates u and v are then defined such that x and y are given by:

$$x = u \tag{1a}$$

$$y = v[f_n(u) - f_d(u)] + f_d(u) \tag{1b}$$

where $f_n$ and $f_d$ are near and intermediate distance viewing zone boundary functions given by:

$$f_n(u) = a_n u^2 + b_n \tag{2a}$$

$$f_d(u) = a_d u^2 + b_d \tag{2b}$$

where $a_n$, $b_n$, $a_d$, $b_d$ are constants.
The lens surface height is given by a "Final Surface Function" $Z_f(x,y)$ such that:

$$Z_f(x,y) = Z_b(x,y) + Z_h(x,y) \tag{3}$$

where $Z_b$ is a "Base Surface Function" and $Z_h$ is an "Optimisation Function".
In turn, $Z_b$ is given by:

$$Z_b(x,y) = Z_d(x,y) + Z(x,y) \tag{4}$$

where $Z_d$ is the surface function of the intermediate distance viewing zone, extended over the entire lens, and $Z$ is a "Deviation Function".

The intermediate zone surface function $Z_d$ is in this example a spherical surface with radius of curvature $R_d$ given by:

$$Z_d(x,y) = R_d - [R_d^2 - x^2 - y^2]^{1/2} \tag{5}$$

The deviation function $Z$ (in equation (4) above) is defined piecewise by:

$$Z(x,y) = 0 \quad \text{when } v < 0 \tag{7a}$$

$$Z(x,y) = kv^3(1-v)^3 \left(\frac{1}{2} - v\right) u^2 + \sum_{i=0}^{8} \sum_{j=0}^{7} A_{ij} u^i v^j \quad \text{when } 0 \leq v \leq 1 \tag{7b}$$

$$Z(x,y) = Z_s(x,y) \quad \text{when } v > 1 \tag{7c}$$

where k and $A_{ij}$ are constants and where $Z_s$ is a "segment" or "near zone" function given by:

$$Z_s(x,y) = A_s[(x - x_o)^2 + (y - y_o)^2] + \tag{8}$$
$$B_s[(x - x_o)^2 + (y - y_o)^2]^2 + C_s[x - x_o]^4 + z_o$$

where $A_s$, $B_s$, $C_s$, $x_o$, $y_o$ and $z_o$ are constants.
As specified above, the lens surface height is given by a "Final Surface Function" $Z_f(x,y)$ such that:

$$Z_f(x,y) = Z_b(x,y) + Z_h(x,y) \tag{3}$$

The function $Z_h$ appearing in equation (3) is given piecewise by:

$$Z_h(x,y) = 0 \quad \text{when } v < 0 \tag{9a}$$

$$Z_h(x,y) = v^3(1-v)^3 \sum_{i=4}^{8} \sum_{j=0}^{3} A_{h_{ij}} u^i \left(\frac{1}{2} - v\right)^j \quad \text{when } 0 \leq v \leq 1 \tag{9b}$$

$$Z_h(x,y) = 0 \quad \text{when } v > 1 \tag{9c}$$

where $A_{h_{ij}}$ are constants.
The numerical values of the various constants referred to in the equations above are given in the following tables.
The numerical values of the various constants where the intermediate distance viewing zone is a spherical surface are given in the following tables.

TABLE 1

Zone Boundary Constants:

| | |
|---|---|
| $a_n = -.0444444$ | $b_n = -10.0000$ |
| $a_d = .0444444$ | $b_d = 10.0000$ |

TABLE 2

Intermediate Viewing Zone Constants

Radius of Curvature: $R_d = 108.83$ mm

TABLE 3

Deviation Function Constants:

$k = 4.000 \times 10^{-02}$ $A_{04} = 2.064578491997513 \times 10^{-01}$ $A_{05} = -8.766603343934317 \times 10^{-02}$ $A_{06} = 3.931206879398031 \times 10^{-03}$ $A_{24} = 3.056024800977399 \times 10^{-02}$ $A_{25} = -6.973876096283535 \times 10^{-02}$ $A_{26} = 5.754640466168145 \times 10^{-02}$ TABLE 3-continued Deviation Function Constants:

$A_{27} = -1.643681605333130 \times 10^{-02}$ $A_{44} = -1.467373195061980 \times 10^{-05}$ $A_{45} = 4.324727024198134 \times 10^{-05}$ $A_{46} = -3.704896442469575 \times 10^{-05}$ $A_{47} = 1.058512719012445 \times 10^{-05}$ $A_{64} = -8.018172839495184 \times 10^{-10}$ $A_{65} = 1.830136625501446 \times 10^{-09}$ $A_{66} = -5.345448559537294 \times 10^{-10}$ $A_{67} = 1.510013717380003 \times 10^{-10}$ $A_{84} = 1.006675811643418 \times 10^{-12}$ $A_{85} = -4.026703246469297 \times 10^{-12}$ $A_{86} = 4.697820454197059 \times 10^{-12}$ $A_{87} = -1.342234415483603 \times 10^{-12}$ All other $A_{i,j} = 0$

TABLE 4

Near Zone Constants:

$A_s = 1.000 \times 10^{-03}$  $B_s = 8.600 \times 10^{-08}$  $C_s = -2.100 \times 10^{-07}$ $x_o = .00$  $y_o = 1.00$  $z_o = 1.982 \times 10^{-02}$

TABLE 5

Optimisation Function Constants:

$A_{h_{40}} = -2.758738728808031 \times 10^{-05}$ $A_{h_{60}} = 5.857896238949738 \times 10^{-08}$ $A_{h_{80}} = -2.995337547453706 \times 10^{-11}$ $A_{h_{41}} = -3.382459512623298 \times 10^{-04}$ $A_{h_{61}} = 4.712814127714502 \times 10^{-07}$ $A_{h_{81}} = -2.104123596091959 \times 10^{-10}$ $A_{h_{42}} = 1.626705709966197 \times 10^{-04}$ $A_{h_{62}} = -1.955096006065131 \times 10^{-07}$ $A_{h_{82}} = 7.269316021027757 \times 10^{-11}$ $A_{h_{43}} = 1.653714692705777 \times 10^{-03}$ $A_{h_{63}} = -3.085602695681971 \times 10^{-06}$ $A_{h_{83}} = 1.448279966176255 \times 10^{-09}$ All other $A_{h_{ij}} = 0$ A contour plot of surface astigmatism resulting from the above lens design is given in FIG. 1.

EXAMPLE 2

In this example, a progressive lens is produced in a manner similar to that described in Example 1. In this example the intermediate zone surface function $Z_d$ is an aspheric surface of revolution given by:

$$Z_d(x,y) = \sum_{i=0}^{8} C_i r^i$$

where $C_i$ are constants and $$r = (x^2 + y^2)^{1/2} \qquad (6)$$

The numerical values of the various constants where the intermediate distance viewing zone is an aspherical surface of revolution are given in the following tables.

TABLE 6

Zone Boundary Constants:

$a_n = -.0444444$  $b_n = -10.0000$ $a_d = .0444444$  $b_d = 10.0000$

TABLE 7

Intermediate Viewing Zone Constants:

$C_2 = 3.499999999999999 \times 10^{-03}$ $C_4 = -5.640000000000001 \times 10^{-08}$ $C_6 = 4.010000000000000 \times 10^{-11}$ $C_8 = -1.090000000000000 \times 10^{-14}$ All other $C_i = 0$

TABLE 8

Deviation Function Constants:

$k = 4.000 \times 10^{-02}$ $A_{04} = 2.060000000000058 \times 10^{-01}$ $A_{05} = -8.240000000001377 \times 10^{-02}$ $A_{06} = 8.826273045769994 \times 10^{-15}$ $A_{24} = 3.147222222222188 \times 10^{-02}$ $A_{25} = -7.18711111111102 \times 10^{-02}$ $A_{26} = 5.928222222222149 \times 10^{-02}$ $A_{27} = -1.693777777777757 \times 10^{-02}$ $A_{44} = -1.752283950617004 \times 10^{-05}$ $A_{45} = 5.019308641974646 \times 10^{-05}$ $A_{46} = -4.318395061727833 \times 10^{-05}$ $A_{47} = 1.233827160493662 \times 10^{-05}$ $A_{64} = -2.122975527794173 \times 10^{-20}$ $A_{65} = 4.675837136398497 \times 10^{-20}$ $A_{66} = -3.873030285122383 \times 10^{-20}$ $A_{67} = 1.119832469989697 \times 10^{-20}$ $A_{84} = 6.613833120209522 \times 10^{-23}$

TABLE 8-continued

Deviation Function Constants:

$A_{85} = -1.221041100588967 \times 10^{-22}$ $A_{86} = 9.480870015243333 \times 10^{-23}$ $A_{87} = -2.684817792194514 \times 10^{-23}$ All other $A_{i,j} = 0$

TABLE 9

Near Zone Constants:

$A_s = 1.030 \times 10^{-03}$    $B_s = .000 \times 10^{+00}$    $C_s = -2.100 \times 10^{-07}$ $x_o = .00$    $y_o = .00$    $z_o = 2.060 \times 10^{-02}$

TABLE 10

Optimisation Function Constants:

$A_{h_{40}} = -3.627345101464664 \times 10^{-05}$ $A_{h_{60}} = 6.868427163593657 \times 10^{-08}$ $A_{h_{80}} = -3.218218741540114 \times 10^{-11}$ $A_{h_{41}} = -2.921551229855328 \times 10^{-04}$ $A_{h_{61}} = 3.436355452975115 \times 10^{-07}$ $A_{h_{81}} = -1.503357989146862 \times 10^{-10}$ $A_{h_{42}} = 1.176032808003801 \times 10^{-04}$ $A_{h_{62}} = -3.658318940872175 \times 10^{-08}$ $A_{h_{82}} = 2.292339975419453 \times 10^{-11}$ $A_{h_{43}} = 1.320151771425951 \times 10^{-03}$ $A_{h_{63}} = -2.723441849761595 \times 10^{-06}$ $A_{h_{83}} = 2.157028030405040 \times 10^{-09}$ All other $A_{h_{ij}} = 0$ A contour plot of surface astigmatism resulting from the above lens design is given in FIG. 2.

Finally, it is to be understood that various other modifications and/or alterations may be made without departing from the spirit of the present invention as outlined herein.

We claim:

1. A progressive ophthalmic lens including a lens surface having
    a lower viewing zone for near viewing distances providing a predetermined relatively high surface power; said predetermined power being determined by the viewer's near prescription ($R_x$), the horizontal fitting position of the lens normally being determined by the near pupillary distance of the wearer, and the vertical fitting position normally being determined by the vertical frame midpoint;
    an upper viewing zone of relatively lower surface power for intermediate viewing distances; and
    a corridor of relatively low astigmatism extending there between; wherein the contours of surface astigmatism of the lens are approximately bilaterally symmetric about a vertical lens meridian as fitted to the wearer.

2. A progressive lens according to claim 1 wherein the optical quality is maximised in the lower viewing zone and the optical power of the upper viewing zone is determined indirectly by the application of a power reduction from the optical power of the lower viewing zone.

3. A progressive lens according to claim 2 wherein the physical size of the lower viewing zone is sufficient to allow fixation over an area of approximately 24 cm horizontal×12 cm vertical at a distance of approximately 0.3 m to 0.4 m with high acuity through movement of the eyes alone.

4. A progressive lens according to claim 3 wherein the lower viewing zone width is at least approximately 16 mm, measured on the lens surface, at a vertical position between approximately 5 to 15 mm below a power progression center.

5. A progressive lens according to claim 4 wherein the upper viewing zone width is at least approximately 10 mm at a vertical position between about 5 to 15 mm above the power progression center.

6. A progressive lens according to claim 1 wherein the corridor has a progression length of approximately 5 mm to 20 mm and a progression power of magnitude from approximately 0.50D to 2.00D.

7. The progressive lens according to claim 1 wherein contours of mean surface power are located symmetrically about a horizontal line passing through the center of the lens.

8. The progressive lens according to claim 1 wherein contours of surface astigmatism separate approximately uniformly above and below the lens corridor such that there is an expansion of the width of the upper and lower viewing zones with distance from a horizontal line passing through the center of the lens.

9. A progressive ophthalmic lens for a wearer having different power requirements for near and intermediate distances, the lens having
    a relatively wide lower viewing zone located below a horizontal midline of the lens for providing a relatively high power corresponding to the wearer's near prescription;
    a relatively narrower upper viewing zone located above the horizontal midline of the lens for providing a relatively lower power required by the wearer for viewing at intermediate distances, and
    a corridor of relatively low astigmatism extending between said upper and lower zones in which the power gradually increases from the upper to the lower zone; and
    peripheral lens regions horizontally adjacent to at least the upper viewing zone and corridor which have surface astigmatisms at least 0.5D greater than the corridor and viewing zones.

10. The progressive lens of claim 9 wherein the increase of power from upper to lower zone is from approximately 0.50 to 2.00D.

11. A method of providing a progressive ophthalmic lens for a wearer comprising the steps of
    providing a series of two or more progressive lens surfaces having:
        a lower viewing zone whose optical width and quality have been maximized;
        an upper viewing zone whose surface power is determined indirectly by a gradual reduction in surface power from the surface power of the lower viewing zone; and
        a corridor of relatively low astigmatism extending between the upper and lower viewing zones in which there is a gradual increase in surface power from the upper to the lower zone, wherein surfaces in the series have different amounts of increase in surface power;

determining a near vision prescription of the wearer; and selecting a lens surface for the wearer from the series to provide a lens with power in the lower zone for near viewing distances and with a power in the upper viewing zone for intermediate viewing distances.

12. The method of claim 11 wherein the difference in surface power between the lower viewing zone and the upper viewing zone is from approximately 0.5D to 2.00D.

* * * * *